Dec. 10, 1963 H. DORENDORF 3,114,050

DOUBLE-BASE SEMICONDUCTOR DEVICE FOR PRODUCING A DEFINED NUMBER OF IMPULSES

Filed Jan. 22, 1957 5 Sheets-Sheet 1

Inventor.
Heinz Dorendorf.
By. [signature] Atty.

Inventor:
Heinz Dorendorf
By [signature] Atty.

Dec. 10, 1963 H. DORENDORF 3,114,050

DOUBLE-BASE SEMICONDUCTOR DEVICE FOR PRODUCING A DEFINED NUMBER OF IMPULSES

Filed Jan. 22, 1957 5 Sheets-Sheet 3

Inventor,
Heinz Dorendorf
By. [signature] Atty.

Inventor.
Heinz Dorendorf.
By. [signature] Atty.

Dec. 10, 1963 H. DORENDORF 3,114,050

DOUBLE-BASE SEMICONDUCTOR DEVICE FOR PRODUCING A DEFINED NUMBER OF IMPULSES

Filed Jan. 22, 1957 5 Sheets-Sheet 5

Inventor.
Heinz Dorendorf.
By [signature] Atty.

3,114,050

DOUBLE-BASE SEMICONDUCTOR DEVICE FOR PRODUCING A DEFINED NUMBER OF IMPULSES

Heinz Dorendorf, Munich, Germany, assignor to Siemens & Halske Aktiengesellschaft, Berlin and Munich, a corporation of Germany Filed Jan. 22, 1957, Ser. No. 635,543
Claims priority, application Germany Jan. 23, 1956
6 Claims. (Cl. 307—88.5)

This invention relates to plural electrode semiconductor devices and is particularly concerned with a semiconductor arrangement comprising a plurality of emitter electrodes and a plurality of stable working points.

Filament semiconductor arrangements are known comprising emitter means and two non-blocking base contacts lying on different potentials, disposed at opposite ends of a semiconductor crystal and having several stable working points. The simplest structural element of this kind is frequently designated as a double-base diode. In case there is provided an auxiliary collector, the corresponding device is frequently referred to as a double-base transistor. In order to obtain a clear physical designation of these structural elements, the following discussion will refer to arrangements comprising an emitter and two non-blocking base connections lying on different potentials as "filament diodes" while arrangements comprising emitter means, collector means and two non-blocking base connections lying on different potentials will be referred to as "filament transistors." These arrangements may be used for various switching purposes. It is also known to combine a plurality of such structural elements for carrying out counting or storage operations according to the dual system.

The object of the invention is to extend the use and application of such filament semiconductor devices while at the same time simplifying the structures as well as the circuits therefor.

The invention provides a filament semiconductor arrangement comprising emitter means, two non-blocking contacts and a plurality of stable working points, exhibiting the essential feature according to which a plurality of emitter electrodes are disposed upon the same semiconductor crystal and connected to potentials lying between the potentials of the two non-blocking contacts. One advantage of the structure according to the invention resides in the fact that it can be used for counting operations according to systems other than the dual system. The invention contemplates particularly to provide ten emitter electrodes; the corresponding structure is adapted for use as a decadic counting-and storage unit.

According to a particular embodiment of the invention, the emitter electrodes are connected serially, as seen in the filament direction, that is, in the direction of the two non-blocking electrodes, and are placed on staggered potentials lying between the potentials of the two non-blocking contacts. The invention contemplates primarily connecting the emitters to successively staggered bias potentials.

The various objects and features of the invention will appear from the description of some preferred embodiments which will be rendered below with reference to the accompanying drawings. In these drawings, FIG. 1 shows in schematic manner a rod-like germanium crystal;

FIG. 2 illustrates a circuit for the arrangement according to FIG. 1;

FIGS. 3 and 4 explain the operation of the circuit shown in FIG. 2;

Figure 10:
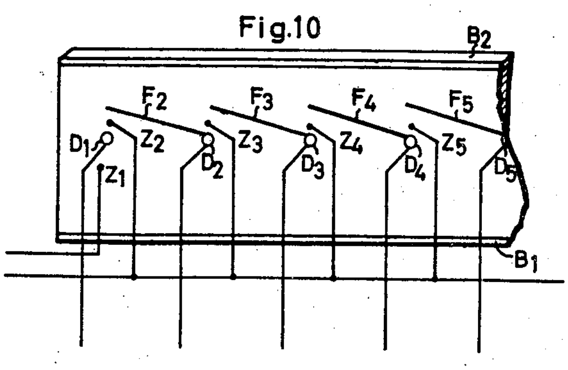
Figure 11:
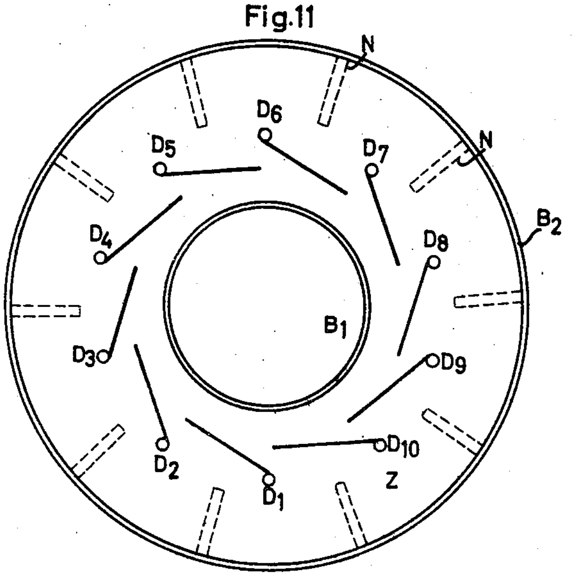

FIG. 10 indicates how the preferential direction for the injection operation may be determined by the form of alloyed p-n connections; and FIG. 11 shows a combination of a series connection of p-n connections with a parallel p-n connection.

Figure 1:
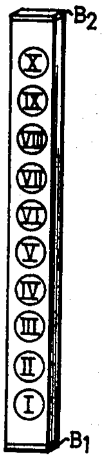

The rod-like germanium crystal shown in FIG. 1 may be about 15–20 mm. long, 1 mm. wide, and about 0.2 mm. thick. At the opposite ends are provided contacts B1 and B2 of a gold-antimony alloy which are alloyed to the crystal in a non-blocking manner. Along the germanium crystal which is n-conductive, alloyed thereto, are ten indium or indium-containing pills I to X, forming with the crystal p-n junctions. These pills serve as emitters and are provided with electrode leads omitted from the figure. The emitters could also be formed by point electrodes. Blocking contacts with marginal blocking coating may be used in this as well as in other embodiments. The entire decadic element may be considered as series arrangement of ten individual filament diodes in a single semiconductor body, provided with two common base electrodes B1 and B2. The semiconductor rod, instead of being made of germanium may be a silicon rod or may be made of other semiconductor elements or semiconductor combinations, for example, $A^{III}B^{V}$, $A^{II}B^{VI}$ and/or $A^{I}B^{VII}$ combinations or of combinations of the elements of the IVth group. It is to be observed, at any rate, that the semiconductor crystal should be of highest purity with diffusion length as great as possible. In the case of germanium, specific resistances of the material, on the order of 20–30 ohm/cm. have been found favorable. In the case of silicon, it is suitable to provide for higher specific resistances which should be close to under the conducting value. In the embodiment discussed, the emitters I to X are mutually similarly spaced.

Figure 2:
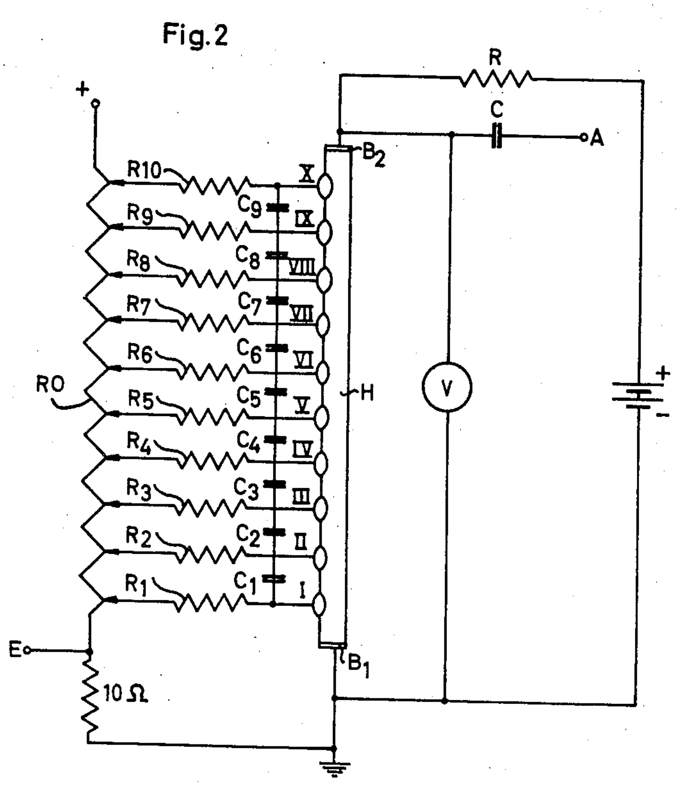

FIG. 2 shows as an example a circuit for the arrangement indicated in FIG. 1, which may serve as a counting- or as a storage element. Similar parts are similarly referenced as in FIG. 1. The rod-like semiconductor body is indicated at H. There are, as in FIG. 1, ten p-n junctions. RO indicates a potentiometer with a transverse current of about 100 milliamperes and with ten taps over which defined potentials can be connected to the p-n junctions I to X by way of ohmic resistors R1 to R10, each having a resistance of about 1 kilo-ohm. Capacitors C1 to C9 serve as storage elements; the 10 ohm resistor is a pre-resistor for the potentiometer RO. Assuming dimensions such as specified for the semiconductor of FIG. 1, a current will flow through the semiconductor H of FIG. 2, which will be on the order of 2 to 3 milliamperes, this current being supplied from a source by way of a resistor R. A voltmeter V is provided for measuring the voltage between B1 and B2. E indicates the input of the circuit; C is a coupling capacitor.

The operation of the arrangement according to FIG. 2 will now be explained with reference to FIGS. 3 and 4.

Figures 3, 4:
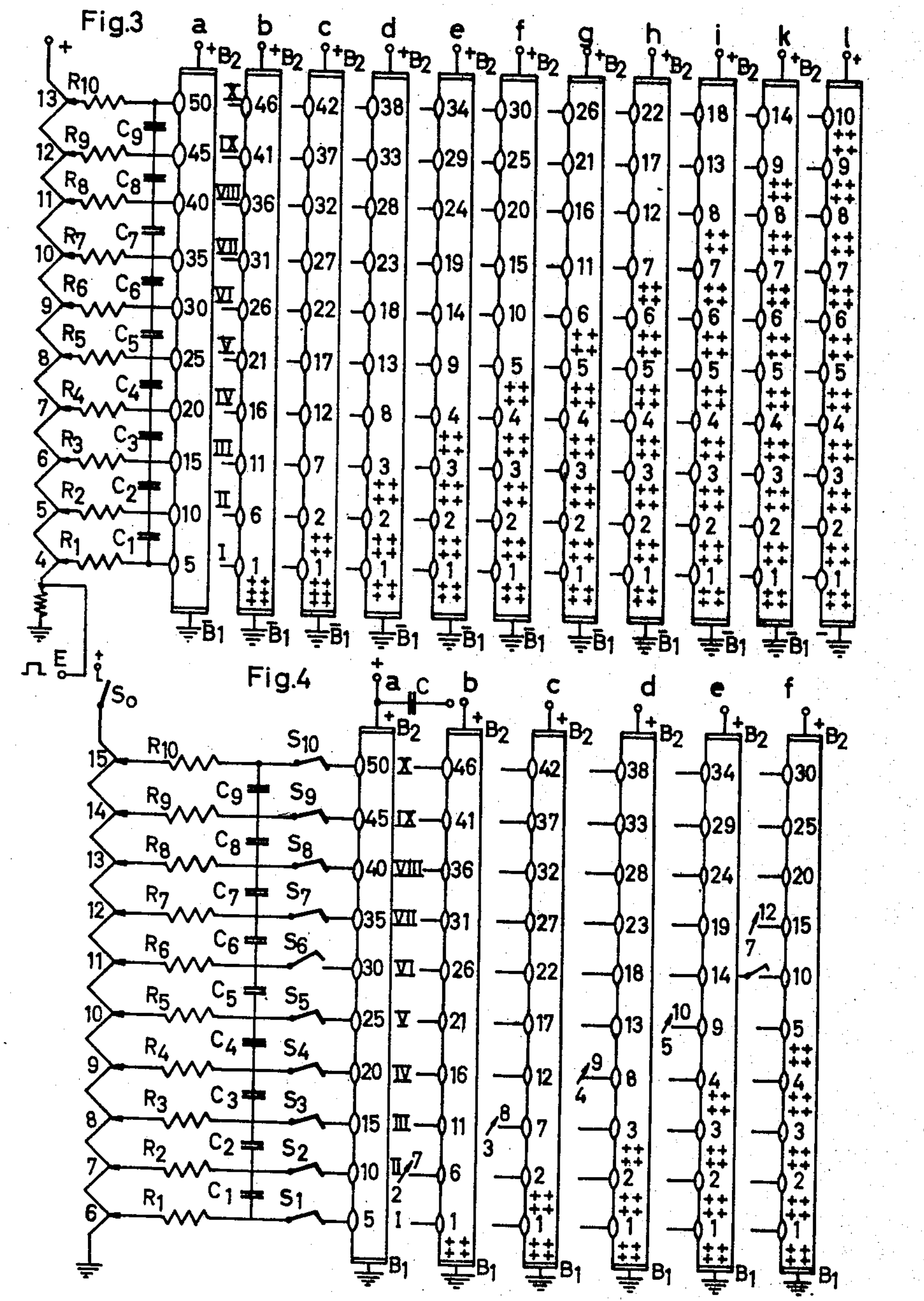

FIG. 3 illustrates the potential conditions obtaining in FIG. 2. The arabic numerals indicate the positive potentials with respect to ground, in a desired measure, for example, in volts. The semiconductor rod H is represented in eleven different potential conditions *a* to *l*.

In the initial condition shown in FIG. 3*a*, all ten p-n junctions will be in blocking direction. It is assumed that the ten taps at the potentiometer RO have potential values from 4 to 13 volts against ground and that they lie at the semiconductor rod H due to the potential of 50 volts, connected thereto, against ground, the voltage drop from one to the next neighboring emitter p-n junction always amounting to 5 volts. In such potential condition, there will be at the p-n junction I a blocking potential of 1 volt, because it is connected in the semiconductor H with 5 volts with respect to ground. There will be in similar manner 5 volts at the junction II, 9 volts at the junction III, etc., each junction of higher order having 4 volts more blocking potential than the preceding junction.

Now, when a positive pulse of about 2 volts is momentarily connected to the input E, all potentials at the potentiometer RO will be momentarily increased by +2 volts. The p-n junction I is thereby briefly placed in pass direction while all remaining p-n junctions receive a positive blocking potential. There will now occur the switching for the p-n junction I known from the filament diode. Defect electrons are thereby injected in the semiconductor through the junction I which reduce the resistance below the connection I to such an extent that only 1 volt will lie at the corresponding part of the semiconductor.

FIG. 3*b* shows the potential conditions after the first counting impulse. The positive symbols indicate the defect electrons injected into the lower part of the semiconductor rod, which are effective to reduce the resistance in such part. The potentials at the junctions I to X are now in the condition *b* from *l* to 46 volts, the total potential at the rod having dropped by 4 volts. The junction I remains in pass condition; the passing current is limited by the resistor R1. The junction II now has 6 volts with respect to ground, that is, 1 volt in blocking direction, as was the case before with the junction I in condition *a*. When a positive pulse of about 2 volts is now delivered to the input E, the same operation will occur with respect to the p-n junction II as occurred before with respect to the p-n junction I incident to the first impulse. This operation is effected because the momentary potential shifting of 2 volts occurring at the potentiometer resistor RO causes the junction II to be placed in pass direction. The region of the semiconductor rod lying between the junctions I and II assumes low resistance due to the injected minority carriers.

New potential conditions thus result after the second pulse, which are represented in FIG. 3*c*. The potential of each of the junctions II to X has again dropped by 4 volts, and junction III will now have 1 volt blocking potential and will thus be prepared for receiving the next pulse delivered to the input E. Incident to such next pulse, the operation will be repeated. All junctions of higher order have higher blocking potentials and with a new pulse, only the next junction which has only 1 volt blocking potential will come to lie in pass direction. The total potential at the semiconductor rod has accordingly decreased by 4 volts after the second pulse.

With each following pulse delivered to the input E, one more p-n junction will be put in pass condition, that is, the junction which is lowest of all the junctions lying in blocking condition. The total potential at the semiconductor rod will thus be reduced stepwise always by 4 volts.

The number of stored pulses can be easily read on the voltmeter V in FIG. 2, such voltmeter accordingly acting in the manner of an impulse counter. Desired operations may be successively effected by the individual impulses by utilizing for this purpose the resistors R1 to R10.

In accordance with a particular feature of the invention, the last impulse, especially the tenth impulse, or rather to say, the impulse caused thereby and affecting the resistor R10, is utilized to affect an amplifying element which in turn produces an impulse for delivery to the input E to cause all connections to assume blocking condition again. The amplifier element produces at the same time an impulse which is conducted to a further, similar impulse counter for the next higher decade. It is in this manner possible to count any desired number of pulses according to the decade system. The arrangement according to the invention may, for example, be employed for the counting of impulses produced by a Geiger counter.

The capacitances C1 to C9 serve to make the circuit largely independent of the amplitude and duration (length) of the input impulses. Considering, for example, the conditions prevailing incident to the delivery of the first impulse, as illustrated in FIG. 3*b*: The blocking potential of the first junction I amounts to 1 volt while that of the connection II amounts to 5 volts. No currents flow through the resistors R1 to R10 excepting the negligible blocking current. The first impulse places the first junction I in condition for passing current, causing the potential of such junction I to be reduced to 1 volt, neglecting thereby the flow resistance of the p-n junction. The capacitor C1 tends to hold the potential at 1 volt and reduces the potential of junction II to 2 volts. The p-n junction or point II thereby assumes momentarily a blocking potential of 8 volts. In accordance with the time constant $R_2 \cdot C_1$, the capacitor C1 will be charged to 4 volts, over the resistor R2 and thereby prepares the connection or junction III for the next impulse.

In accordance with a further feature of the invention, the semiconductor element shown in the various embodiments may also be used as a storage device. In order to extract the stored impulses, it is merely necessary to reverse the polarity of the impulses delivered to the input E. The stored impulses can then be taken from the semiconductor rod H at A by way of the capacitor C (FIG. 2). In such operation, individual pulses to be stored may be delivered to the semiconductor rod, and pulses may be extracted therefrom by oppositely polarized input impulses. The result is a counting device for adding or subtracting as many positive and negative pulses in any desired sequence.

In accordance with another embodiment of the invention, the described semiconductor rod may also be employed to produce from 1 to 10 impulses responsive to depression of a key, once for each impulse. An example of an embodiment for such operation is shown in FIG. 4. The arabic numerals denote potentials as in the previously discussed figure.

The corresponding arrangement comprises in addition to the elements already discussed, a plurality of keys or switches indicated at $S_0$ to $S_{10}$. The potentials on the potentiometer RO are somewhat higher than in the previous embodiment.

Assuming that it is desired to produce, for example, five impulses, the switch $S_6$ will be placed in open position, in which it is shown, and switch $S_0$ will be closed. All other switches are in closed position. Due to the total voltage connected to the potentiometer RO, only the p-n junction I will initially be in pass condition. The potential of 5 volts at the first p-n junction accordingly breaks down to 1 volt, in accordance with the explanations given with reference to FIG. 3. The potential of the remaining points or connections therefore drops likewise by 4 volts. The p-n junction II is immediately after operation of the connection I not in blocking condition because the capacitor C1 has reduced its potential upon operation of the junction I, to 2 volts. The capacitor C1 is now charged by way of the resistor R2 until the p-n junction II assumes a potential of 6 volts. The p-n junction II will at that instant flip into pass direction.

The operation continues in this manner until all junctions below the opened switch have flipped in pass direction. The potential conditions after the 1st, 2nd, 3rd, 4th and 5th impulse are indicated in FIGS. 4*b* to 4*f*. The arrows with the numbers at the beginnings and ends thereof indicate the respective initial and the terminal potentials of the respective p-n junctions due to charging of the corresponding capacitor. It will be seen from FIG. 4f that the seventh junction, that is, the junction following the disconnected junction is increased only to 12 volts as compared with 15 volts on the side of the semiconductor rod. This p-n junction, therefore, remains below the blocking potential, so that no further flipping in blocking direction can be effected from this point on. The impulses can be taken off at the terminal A connected with the capacitor C (FIG. 2).

In addition to the arrangement described, it is possible to produce, with the elements discussed, other and further circuits and modifications. It is, for example, possible, if desired, by the use of further auxiliary electrodes, to modify the described circuit so that only one single connection or junction will be at any time switched or flipped in pass direction. A newly delivered impulse will then effect cancellation of the pass direction of the flipped junction, that is, it will cause such junction to flip to blocking condition while the junction of next higher order will flip into pass direction.

Embodiments and circuits have been described with reference to FIGS. 1 to 4, in which the p-n junctions and the respectively individual injection paths are connected serially. In accordance with a particular embodiment of the invention, it is possible, to modify the semi-conductor element and the circuit means in such a manner, that the p-n junctions will be disposed in parallel, that is, between the non-blocked electrodes, in parallel therewith.

Figure 5:
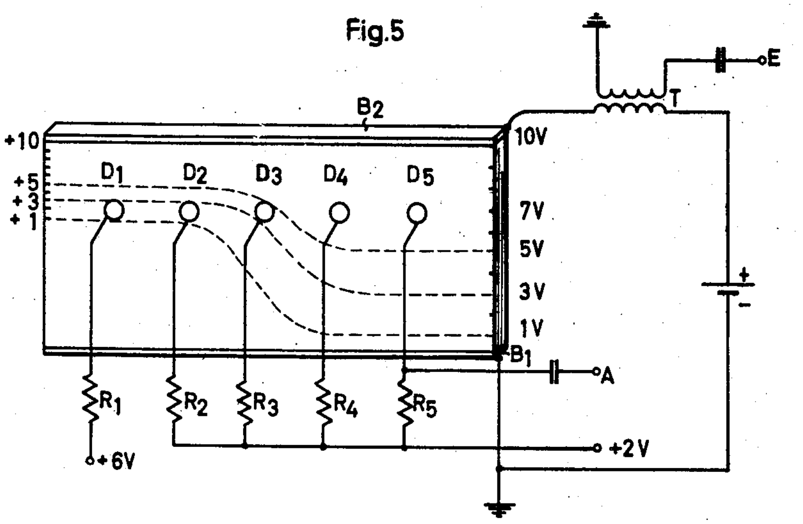
FIG. 5 shows an embodiment with parallel p-n connections in a simple circuit.

FIG. 5 shows a simple example of a circuit arrangement comprising parallel p-n junctions. The semiconductor element is composed of wafers of n-conductive germanium, about 15 x 5 mm. large and a few tenths of one millimeter thick. Along the long edges there are provided flat contacts, for example, made of gold-antimony alloyed to the structure. These two non-blocking electrodes are analogously to FIGS. 1 to 4 again designated by B1 and B2. B2 receives a potential amounting, for example, to +10 volts with respect to the electrode B1 which is grounded. D1 to D5 are five p-n junctions formed of indium pills alloyed to the semiconductor body. These junctions are respectively connected over resistors R1 to R5 to a potential of +6 volts and +2 volts, as shown. When all junctions are in blocking direction, there will obtain a uniform potential distribution between B1 and B2. At the level of the p-n junctions, the semiconductor body, due to the voltage drop between B1 and B2, will have a potential of about +7 volts. D1 is on +6 volts, that is, on 1 volt in blocking direction; D2 to D5 are on +2 volts and, therefore, on 5 volts in blocking direction.

The operation of the arrangement is as follows:

An impulse is delivered to B2 from a transformer T which is operative to lower the potentials in the germanium wafer briefly to such extent that D1 is flipped in pass direction. D2 to D5, however, remain in blocking direction. The potential on the germanium, between D1 and B1 is reduced to +1 volt by the injection of the defect electrons. The potential of the germanium between D3, D4, D5 and B1 still amounts to +7 volts, the potential between D2 and B1 has, however, dropped to about +3 volts, due to the vicinity to D1. D2, therefore, is on 1 volt in blocking direction (D3 to D5 continue to retain 5 volts) and will flip in pass direction responsive to the next impulse.

The dotted lines in FIG. 5 indicate the potential conditions in the semiconductor after the second impulse. Each, D1 and D2 have at that instant a potential of +1 volt and are in pass direction; between D4 as well as D5 and B1, the semiconductor has a voltage drop of +7 volts, D4 and D5 are accordingly still on 5 volts in blocking direction; D3, however, is only on 1 volt in blocking direction because the semiconductor has between D3 and B1 only a potential drop of +3 volts.

The interaction is repeated responsive to further impulses analogous to FIGS. 1 to 4. The arrangement accordingly permits to carry out counting as well as storage operations, etc. A decade basis may be obtained by adding further p-n junctions.

Figure 6:
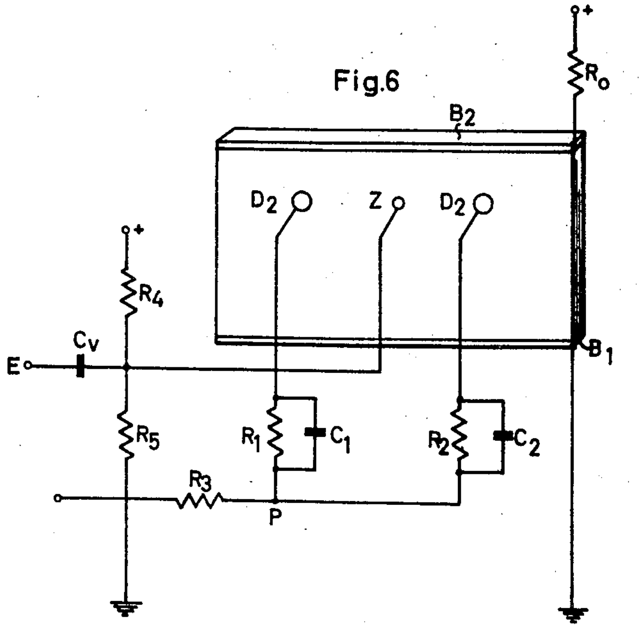
FIG. 6 illustrates a modified arrangement acting as a flip-flop circuit.
Figure 7:
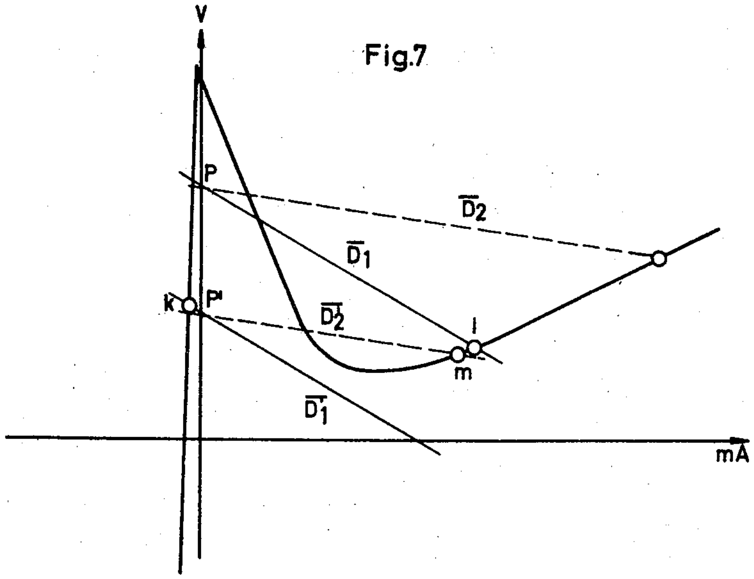
FIG. 7 shows curves to aid in explaining certain operations.

FIG. 6 indicates a modified arrangement for operation as a flip-flop circuit with 3 p-n junctions D1, D2 and Z. D1 and D2 operate as triggering electrodes; Z operates as auxiliary electrode. When a positive impulse is delivered to Z, the p-n junction which happens to be in blocking direction will flip to pass direction. Assuming that D1 has a potential in pass direction, being conductive, and D2 to be in blocking condition. The point P has a potential which can be determined from the current-voltage characteristic of a p-n junction, shown in FIG. 7. The resistance curve D1 corresponds to the value of the ohmic resistor R1. The intersection *i* between the characteristic and the resistance curve D1 indicates the stable working point of the conductive p-n junction D1. An impulse delivered to the p-n junction Z will make D2 conductive in addition to D1. Shortly after this injection impulse, both p-n junctions D1 and D2 will accordingly be conductive, while Z, due to corresponding dimensioning of the resistors R4 and R5 will block again after cessation of the injection impulse. The current flowing through the resistor R3 will be doubled by this operation and the potential at the point P will at the same time drop to the value P′. R3 is so dimensioned that both p-n junctions cannot be conducting simultaneously. In FIG. 7, the resistance curve D is shifted with P parallel to $D'_1$ which has with the characteristic an intersecting point K only at the blocking side. D1 accordingly flips in blocking direction. D2, however, remains conductive because D2 has initially a lower working resistance. Since the capacitor C2 (FIG. 6) is not yet charged, the current will flow over C2 and, in a sense, shunts the resistor R2 until the charging of C2 is completed. The working resistance curve D2 in FIG. 7, which corresponds to the p-n junction D2 is much flatter, furnishing an intersecting point *l* with the characteristic curve on the pass side, such point shifting to *m* after P has shifted to P′.

Accordingly, the impulse on Z has put D1 in blocking condition while flipping D2 in pass direction. A further impulse will cause D2 to flip in blocking direction while flipping D1 again in pass direction.

The above explained operations constitute a basis for the counting arrangement to be described next with reference to FIG. 8.

Figure 8:
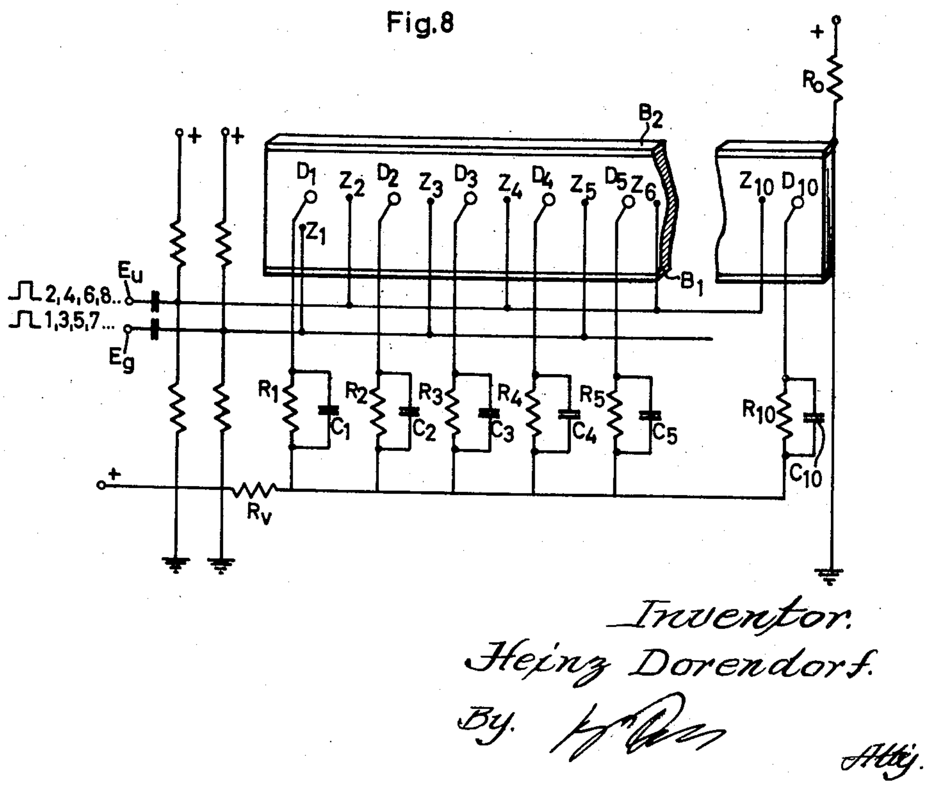
FIG. 8 illustrates an example of a decade counting element with 10 p-n connections.

FIG. 8 shows as an example, in schematic manner, an embodiment of a decadic counting device with ten p-n junctions D1 to D10 as counting electrodes, and 10 p-n junctions Z1 to Z10 as impulse electrodes, the latter producing injection pulses responsive to delivered impulses. The even and odd numbered impulse electrodes are respectively connected together. Care must be taken to conduct the delivered impulses alternately respectively to the even and odd numbered counting electrodes. This may be done, for example, in accordance with the arrangement illustrated in FIG. 6.

The operation is as follows:

Assuming that D3 in FIG. 8 is conducting; it will in such case have a very low potential which also will affect the adjacent p-n junctions D2 and D4 the potentials of which will drop somewhat, making them receptive for receiving impulses to be counted. The odd and even impulse electrodes are respectively connected together in order to cause the injection of the minority carriers to move responsive to the counting pulses to the right. Since the next impulse will affect the even impulse electrodes, the injection can leap from D3 to D4 but not from D3 to D2. This "leaping" will cause the flipping operations described in connection with FIG. 6.

Figure 9:
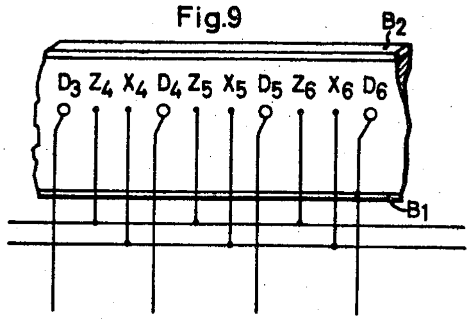
FIG. 9 shows how impulse electrodes can be combined.

The counting arrangement, generally by the disposition of the impulse-and/or other auxiliary electrodes, or by suitable switching provisions, is given a preferential direction in which the injection is to move. In accordance with FIG. 8, this has been done by subdivision of the impulse electrodes into odd and even numbered electrodes. There are, however, other possibilities. For example, it is possible, to dispose between each two counting electrodes always two impulse electrodes. The impulse electrodes Z and the impulse electrodes X, FIG. 9, are respectively connected together. An incoming impulse is again to be converted into a dual pulse. The first part of the dual pulse is delivered to the impulse electrodes *Zi*. If, for example, D4 is in pass condition, Z5 will flip over in pass direction. The second part of the dual impulse is delivered to *Xi*. X5 now flips and places D5 in pass direction. Z5 and X5 return into blocking condition upon cessation of the impulse. The operations described in connection with FIG. 6 will be effected with respect to D4 and D5, placing D4 in blocking condition.

In FIG. 10, the preferential direction for the injection operation is given by the shape of the p-n junctions alloyed to the semiconductor. The individual p-n junction has the shape of a disk with an extension F2, F3, etc., respectively projecting obliquely upwardly therefrom. The p-n junctions are connected so that only the circular lower portions inject minority carriers. The extension remains in blocking direction. An incoming impulse will cause the outer end of the extension of the next successive p-n junction to flip into pass direction. The entire next successive p-n junction will consequently gradually flip into pass direction; the preceding junction and the extension of the following p-n connection are, however, placed in blocking direction.

Other arrangements are feasible in which a preferential direction is obtained solely by corresponding shaping of the electrodes. If desired, auxiliary impulse electrodes Z1 to Z6 may be provided. It is also possible to produce a preferential direction by exterior means, for example, by a magnetic field; in such a case, there is the possibility to effect an alteration of the preferential direction, for example, reversal thereof.

It is particularly for counting devices suitable to make the semiconductor element circular, so that the tenth p-n junction comes to lie adjacent the first junction. Such an embodiment is shown in FIG. 11 to give an example.

In FIG. 11, Z indicates an impulse electrode which prepares for the reception of the first impulse and sets the position "zero" by flipping the p-n junction D10 into pass direction. After the first impulse, the p-n junction D1 will become conductive, etc., as described with reference to the previous embodiments.

In order to further secure the expansion direction of the minority carriers in the desired sense—in the example under discussion in clockwise direction—grooves N are cut into the semiconductor wafer as shown in FIG. 11. These grooves or slots prevent production of shunts, by the minority carriers, between the p-n junctions, marginally of the semiconductor body.

The invention is not limited to the examples explained and illustrated. The various indicated means for determining the direction of travel of the minority carriers may be applied individually or in suitable combination as well as in modified form. As particularly effective means may be considered, as mentioned, the arrangement of one or more impulse electrodes in suitable position with respect to the p-n junctions; a magnetic field of suitable strength, direction and arrangement; the shape and disposition of the p-n junctions; and the shape of the semiconductor body.

A further modification may be effected by a series arrangement of p-n junctions according to FIGS. 1 to 4 in combination with a parallel arrangement of p-n junctions according to FIGS. 5 to 11, either in a single structural unit and/or by interconnection of different units. It is furthermore possible, as proposed in copending application Serial No. 620,930, filed November 7, 1956, now Patent No. 2,993,126, to provide between or preferably angularly opposite the p-n junctions acting as emitter, auxiliary p-n junctions acting as collector. It is possible to interpose defined interruptions or other differentiation in the storage- and counting operations, by varying the spacing between the p-n junctions, especially by non-uniform disposition of the spacing or by insertion of gaps of different extent and/or by non-uniform staggering of the potentials which are connected to the p-n junctions. Delays in the switching operations or defined non-uniform rhythm of the switching operations, counting operations, coding, etc., may likewise be effected by such means.

Changes may be made within the scope and spirit of the appended claims.

I claim:

1. A semiconductor device for producing a defined number of impulses, comprising a rod-shaped semiconductor body carrying at each end thereof a non-blocking base electrode, a plurality of identical emitter electrodes alloyed into said semiconductor body intermediate said base electrodes in a row in successive substantially uniformly spaced apart relationship, each emitter electrode forming a pn-junction, circuit means for placing the emitter electrodes with respect to one of said base electrodes the spacing of which, from the respectively next adjacent emitter electrode corresponds at least to the spacing between two mutually adjacently positioned emitter electrodes, on uniformly staggered bias voltages, whereby the bias voltages on the respective emitter electrodes increase with respect to said one base electrode by the same amount with growing spacing from such one base electrode, said circuit means comprising a potentiometer connected to a direct current source and forming a voltage divider, a resistor provided for each emitter electrode, means for connecting each resistor to a tap of said potentiometer, whereby each emitter electrode is placed on a successively higher voltage, means for connecting said one base electrode with said potentiometer at a point thereof which is selected so that voltage between said one base electrode and the next adjacent emitter electrode is lower than the voltage between two mutually adjacent emitter electrodes, whereby all emitter electrodes are with respect to said one base electrode biased with identical polarity, a capacitor for bridging each two mutually adjacent emitter electrodes, a further direct voltage source connected to said one and to the other base electrodes which are disposed at the opposite ends of said semiconductor body, said further voltage source biasing the other base electrode with respect to said one base electrode with identical polarity as the emitter electrodes to such extent that the emitter electrode which is disposed adjacent to said one base electrode is responsive to the application of a predetermined voltage thereon placed in flow direction while the other emitter electrodes are in blocking condition, the spacing between any two mutually adjacent emitter electrodes being such that upon transition of one emitter electrode into flow direction the emitter electrode which follows such electrode in the direction of said other base electrode flips responsive to the bias voltage thereof likewise to flow condition while the emitter electrodes following such latter electrode in the direction of said other base electrode remain in blocked condition in the absence of bias voltage on the intermediately positioned emitter electrode.

2. A semiconductor device according to claim 1, wherein one of said electrodes is placed on a bias potential which is higher than the bias potential placed on the remaining electrodes.

3. A semiconductor device according to claim 1, comprising circuit means for feeding impulses thereto, said circuit means having an input and a resistor disposed between said potentiometer and said one base electrode.

4. A semiconductor device according to claim 3, comprising an output, and a capacitor disposed between said output and at least one of said base electrodes.

5. A semiconductor device according to claim 4, wherein the material of said semiconductor body exhibits nearly intrinsic conductivity.

6. A semiconductor device according to claim 5, wherein the material of said semiconductor body exhibits great diffusion length of the charge carriers.

References Cited in the file of this patent

UNITED STATES PATENTS

| | | |
|---|---|---|
| 2,655,607 | Reeves | Oct. 13, 1953 |
| 2,717,342 | Pfann | Sept. 6, 1955 |
| 2,761,020 | Shockley | Aug. 28, 1956 |
| 2,770,740 | Reeves | Nov. 13, 1956 |
| 2,801,348 | Pankove | July 30, 1957 |
| 2,802,968 | Knott et al. | Aug. 13, 1957 |
| 2,832,898 | Camp | Apr. 29, 1958 |
| 2,836,797 | Ozarow | May 27, 1958 |
| 2,877,358 | Ross | Mar. 10, 1959 |
| 2,889,469 | Green | June 2, 1959 |
| 2,984,752 | Giacoletto | May 16, 1961 |

FOREIGN PATENTS

| | | |
|---|---|---|
| 165,612 | Australia | Oct. 14, 1955 |